United States Patent [19] [11] 4,114,360
Emmons [45] Sep. 19, 1978

[54] PIGGING STRING AND METHOD OF MANUFACTURE

[76] Inventor: Johnny Dale Emmons, Rte. 3, Box 97-A-4, Mansfield, Tex. 76063

[21] Appl. No.: 794,939

[22] Filed: May 9, 1977

[51] Int. Cl.² .................. D02G 3/44; B65H 69/06
[52] U.S. Cl. ............................. 57/142; 57/159; 87/8
[58] Field of Search ............... 57/22, 23, 142, 159; 87/7.8

[56] References Cited

U.S. PATENT DOCUMENTS

| | | | |
|---|---|---|---|
| 1,839,698 | 1/1932 | Novotny | 57/142 |
| 3,013,463 | 12/1961 | Gathman et al. | 57/142 X |
| 3,040,402 | 6/1962 | Rible | 57/142 X |
| 3,122,878 | 3/1964 | Meals | 57/142 |
| 3,204,519 | 9/1965 | Lawson et al. | 57/142 X |
| 3,492,181 | 1/1970 | Riseley | 57/23 X |

FOREIGN PATENT DOCUMENTS 226,862  9/1958  Australia ..................... 57/159

Primary Examiner—Donald Watkins
Attorney, Agent, or Firm—Crisman & Moore

[57] ABSTRACT

A relatively short and improved multistranded rope member, commonly referred to as a pigging string, particularly adapted for rodeo applications and the like. The improved pigging string includes an integrally back spliced loop in one end thereof and is therein fabricated without twist bias to provide a smooth and reliable interconnection in a hard, yet pliable tying element for binding calves' feet during rodeo competition. The back splice is formed during twist fabrication of the pigging string in an intermediate section thereof and is so configured as to alleviate twist-ridges and loose strand lays which often interfere with maximum efficiency in use of pigging strings. Likewise, the pigging string is assembled in a taut configuration around the back spliced loop, then immersed in a preheated wax mixture prior to being post stressed during cooling. In this manner the pigging string provides the requisite tensile strength in a tightly wound, pliable embodiment affording a balanced use thereof as necessary where time is precisely recorded.

11 Claims, 5 Drawing Figures

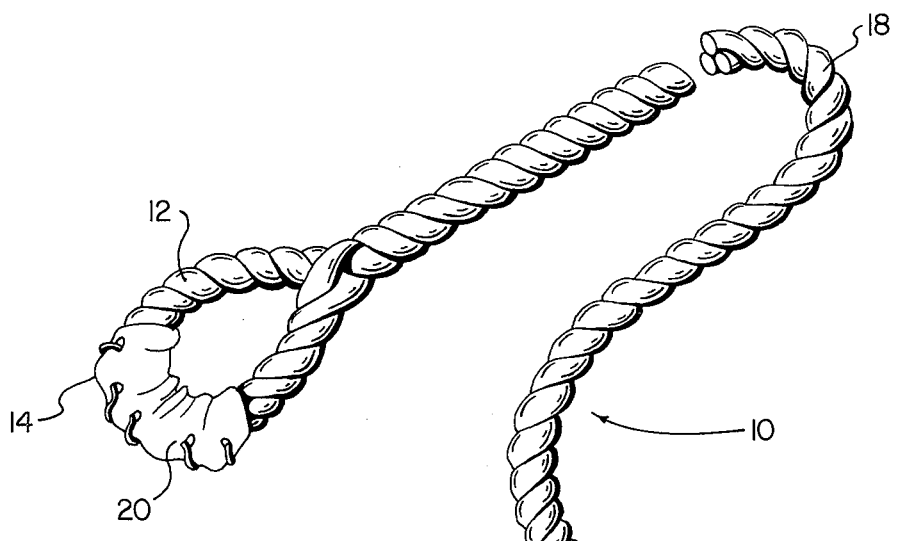
FIG. 1
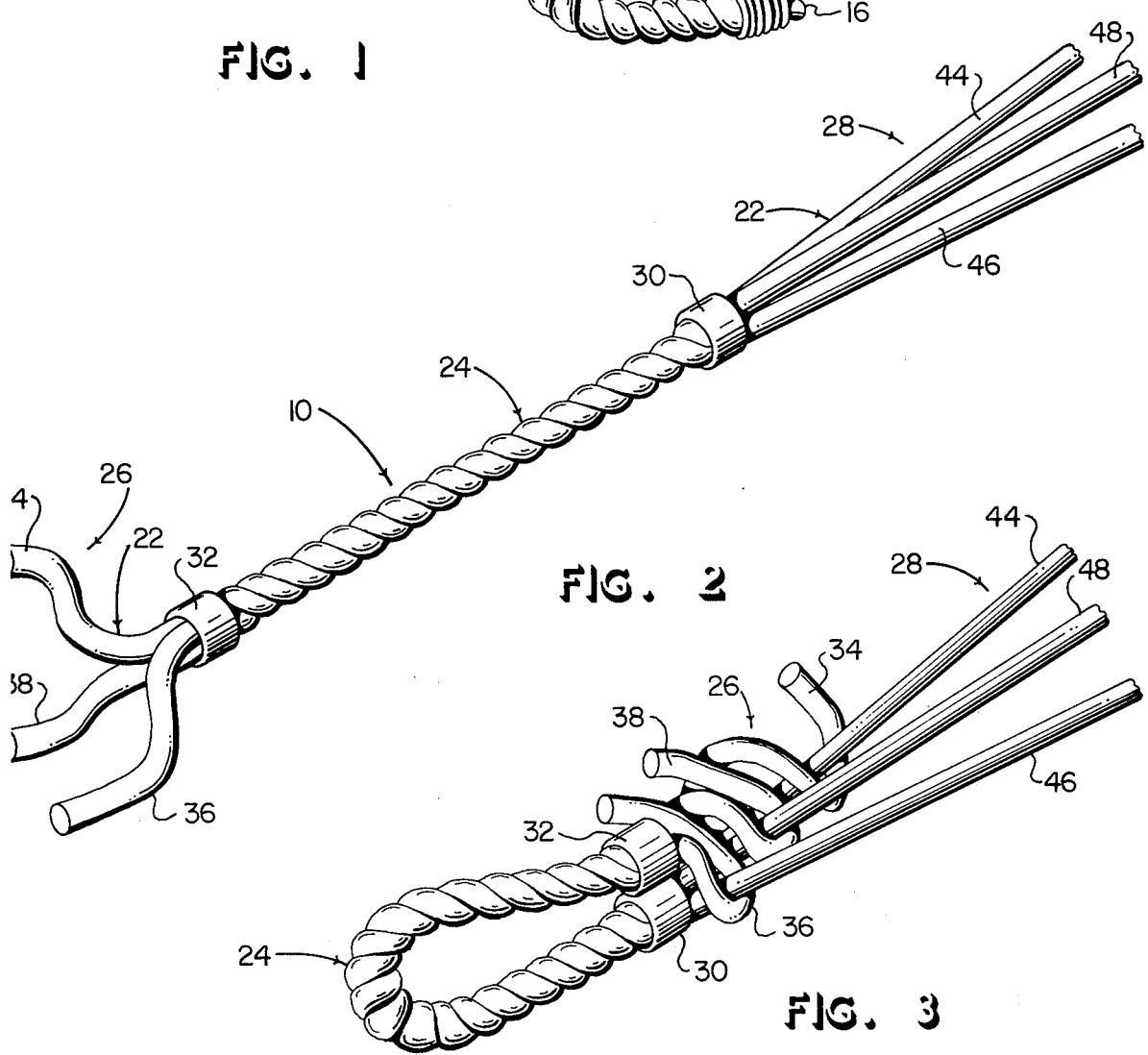
FIG. 2
FIG. 3

PIGGING STRING AND METHOD OF MANUFACTURE

BACKGROUND OF THE INVENTION

The present invention relates to a rope element, and, more particularly, to a relatively short rodeo rope commonly referred to as a pigging string. Rodeo events commonly require the use of such ropes to tie the feet of calves which have been roped from horseback. The rodeo rider carries the pigging string to the roped calf, forces it off of its feet and utilizes the pigging string to bind the animal's legs. Time is generally of the essence. In fact, the whole event is usually judged according to the amount of time required to render the animal nonambulatory. For this reason, all associated apparatus such as lariats and pigging strings involved in the event must facilitate the rodeo rider's speed and effectiveness.

Prior art constructions of ropes for use as pigging strings have not been uniform and have varied considerably in both materials and technique of fabrication. On the average, such strings are on the order of six feet long and include an eye, or loop, at one end. However, the various rope characteristics such as stiffness, hardness, twist density, pliability, weight and durability have not been consistent, therein presenting problems. As in any athletic event, the "tools" of the event are integral to the success of the participant. Variations in the aforesaid characteristics of pigging strings thus affect the performance of the rodeo rider. It is particularly important for the pigging string to be hard and tightly woven to prevent stretching, while sufficiently pliable and balanced to facilitate the tying action therewith.

The main problematic manifestation in pigging strings centers in the loop at the one end. The loop must provide the requisite tensile strength without being loose or bulky. For reasons of balance and control, it is preferable for the loop to smoothly blend into the remaining string section. Such a configuration is difficult to achieve. Standard textile rope splicing techniques and the improvements thereto have not provided a suitable back splice configuration for pigging strings. For example, U.S. Pat. No. 3,411,400 issued to Morieras et al. on Nov. 19, 1968, discloses an improved back spliced loop for textile ropes. Such techniques as described therein illustrate the utility of effective back splice configurations. However, pigging strings do not normally lend themselves to such sophisticated multistranded braiding for reasons of size, weight, balance, and related characteristics.

Most prior art pigging strings are comprised of either grass or nylon ropes having a loop formed therein by a "knot"-like interlace. Generally, the pigging string of this type is formed by cutting a longer rope and utilizing a splicing device to weave the untwisted end thereof back into an intermediate region therealong. Such a device and technique is illustrated in U.S. Pat. No. 2,112,176 issued to Olsson on Mar. 22, 1938. Although effective in creating a loop, or eye, splicing devices generally do not permit the formation of the smooth interface and tautness needed in pigging strings due to their short length. Moreover, the optimal pigging string loop has no "twist bias" and is considerably shorter than conventional back splicing embodiments wherein the end of the rope is woven into the intermediate section of rope a plurality of times.

It would be an advantage therefore to provide a pigging string having a uniform hardness, tautness and pliability therealong and around a loop formed on the end thereof, which loop is substantially devoid of twist bias, ridges or loose strand ends. The pigging string and method of fabrication therefor of the present invention is especially adapted for just such an embodiment. The loop is formed during fabrication of the string, while it is being twisted and may be constructed with zero twist bias. In this manner, the tautness of the pigging string can be uniformly maintained even in the loop, which can be secured without multiple weaving therealong. The pigging string of such an assembly also facilitates improved fabrication techniques due to the inherent back splice solidarity.

SUMMARY OF THE INVENTION

The invention relates to pigging strings for rodeo riders wherein the pigging string is manufactured with a taut, integrally formed backsplice. More particularly, one aspect of the invention includes an improved pigging string of the type including a plurality of core filaments twisted into an elongated rope section of fixed length with a loop secured at one end thereof. The improvement comprises a first length of core filaments tautly twisted into an intermediate loop section therein being reversed upon itself. The loop section is intermediate of second and third core filament sections intertwined one with the other. The second core filament section is substantially shorter than the third core filament section and integrally interlaced therein in an untwisted state prior to the twisting of the third core filament section thereagainst. The third core filament section being in a tautly twisted configuration adjacent the loop section, thereby secures the untwisted interlaced core filaments of the second core filament section securely thereagainst.

In another aspect, the invention includes a pigging string wherein three core filaments are twistably united and the second core filament section is integrally interlaced into the third core filament section through a single phase juncture. The single phase juncture includes the uppermost core filament of the second core filament section wrapped once around the uppermost core filament of the third core filament section. The single phase juncture also includes the two lower core filaments of the second core filament section respectively wrapped, once around and singularly through the two lower core filaments of the third core filament section. The ends of the three core filaments of the second core filament section are then cut to lie substantially adjacent the periphery of the third core filament section, alleviating twist ridges and loose strand lays.

In yet another aspect, the invention includes a method of fabricating a pigging string having a loop integrally formed on one end thereof and including three strands of filaments twistably united through the steps of extending the strands in a lengthwise configuration between two points and then twisting a first segregated section of strands adjacent one of the points. A first end of the first section of twisted strands is secured adjacent the nontwisted strands. Next, a length of the strands on the opposite, second end of the first section of strands is untwisted. A second end of the first section of twisted strands adjacent the untwisted strands is then secured and the first section of strands is reversed upon itself, whereby the second end of the first section of twisted strands is disposed adjacent the first end. The untwisted strands are interlooped through adjacent nontwisted strands with the ends of the untwisted strands extending outwardly therefrom. The nontwisted strands are then twisted adjacent the loop for securing the untwisted strands thereagainst and providing the pigging string in a fixed length.

The final fabrication step in the assembly of the pigging string of the present invention also includes dipping the fixed length string in a hot wax bath. The string is then permitted to cool in a stressed condition. In this manner the pigging string and particularly the loop thereof provides the requisite rigidity and tensile strength in a tightly wound, pliable embodiment. The absence of loose strands and ridges around the loop further facilitates a balanced use thereof and the requisite reliability necessary in rodeo competition.

BRIEF DESCRIPTION OF THE DRAWINGS

For a more complete understanding of the present invention, and, for further objects and advantages thereof, reference may now be had to the following description taken in conjunction with the accompanying drawings, in which:

FIG. 1 is a fragmentary, perspective view of a pigging string fabricated in accordance with the principles of the present invention;

FIG. 2 is a fragmentary, perspective view of one step in the fabrication of the pigging string of FIG. 1;

FIG. 3 is a fragmentary, perspective view of a subsequent assembly step in the fabrication of the pigging string of FIG. 2, illustrating the interlooping of untwisted strands into nontwisted strands to provide an integrally formed eye member;

DETAILED DESCRIPTION

Figure 4:
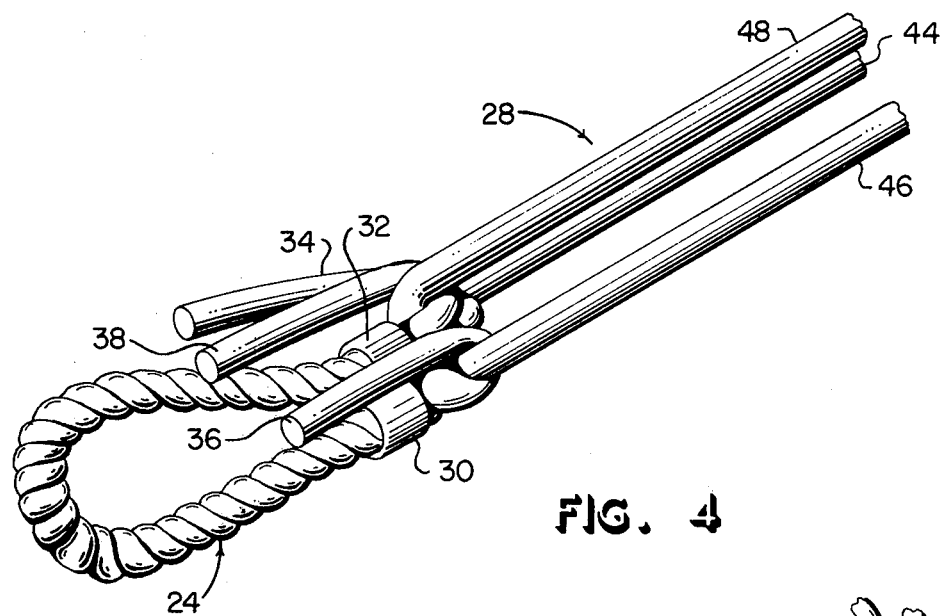
FIG. 4 is a fragmentary, perspective view of the interlooped strands of FIG. 3 in a tautly isolated configuration.

Referring first to FIG. 1, there is shown a relatively short, multistranded rope member 10 of the type commonly referred to as a pigging string. In rodeo competition, such rope members are used to bind calves' feet after the animals have been roped from horseback. The pigging string 10 of the present invention is constructed of relatively short length and with a single loop, or eye 12, at one end 14 thereof. The opposite end 16 is usually threaded through the eye 12 during rodeo use to form an adjustable loop which is tightened around the roped animals' feet.

The eye 12 of the invention is integrally formed in the body 18 of the pigging string 10. As used herein, the term "integrally formed" shall mean constructed therein during fabrication thereof as contrasted to conventional back splice methods wherein the eyes are formed by weaving loose strands into an already twisted rope member.

The integrally formed eye 12 is constructed in such a way as to eliminate ridges and loose strands commonly found in prior art pigging strings. In this manner, also, the ends of the interlaced strands are secured between the twists thereof so as to not protrude therefrom. A rope guard 20, or jacket, is illustrated upon the end section of the eye 12, as such is conventionally provided for durability.

Referring now to FIG. 2, there is shown one step in the fabrication of the pigging string 10 in accordance with the principles of the present invention. In the particular embodiment shown herein, three core filaments, or strands 22, are utilized. These strands 22 may be of conventional rope material such as hemp or nylon. The strands 22 are first extended between two support points (not shown) for assembly purposes. The "points" are generally fasteners, or the like, of the type utilized in rope manufacture; which support the ends of various strand elements prior to the twisting thereof. Usually a first of said points, or fasteners is rotatably mounted for twisting the strands 22 extending therefrom and relative to the second opposite point. Such apparatus for supporting and twisting core filaments is conventional, does not comprise a part of the present invention, and is therefore not illustrated herein.

Still referring to FIG. 2, the first step in assembling the pigging string 12 is the twisting and isolation of a first short section 24 of the nontwisted strands 22, to form the body of the eye 12. The twisted section 22 is intermediate of second and third strand sections 26 and 28, respectively, and may be constructed without twisting either of said outer strand sections. In this manner, both outer strand sections 26 and 28 may remain nontwisted, as that term is used herein. However, the most expedient and preferable manner of construction is the twisting of the strands 22 from the first point of support thereof, back through sections 26 and 24, leaving section 28 nontwisted. A first end of section 24, adjacent section 28 is then secured with tape 30, or the like, to prevent untwisting. Next, the opposite, second, end of section 24 is also secured with tape 32, or the like, to prevent untwisting. The first point of support is then detached from the strands 22 and the strands forming section 26 thereof are untwisted, as shown in FIG. 2. Preferably, the strands 22 of section 26 are relatively short, on the order of six inches, since little more is needed to interloop the nontwisted strands of section 28.

Referring now to FIG. 3, there is shown the assembly of the twisted section 24 into the eye 12. The strands 22 of section 26 are brought to a position adjacent the strands 22 of section 28 and interlaced therein in a manner herein referred to as "interlooping". The individual strands 22 of untwisted section 26 are comprised of strands 34, 36 and 38 as shown. The individual strands 22 of the nontwisted section 28 are comprised of strands 44, 46 and 48. The strand numbering will facilitate explanation of the specific nature of interlooping as that term is used herein.

Still referring to FIG. 3, it may be seen that strand 36 is once wrapped around strand 46, strand 38 once wrapped around strand 48 and strand 34 once wrapped around strand 44. The particular strand interengagement herein defined is preferable to eliminate ridges and loose lays and provide a substantially rigid eye 12. Moreover, in this manner the eye 12 is formed without twist bias, which is the condition of the loop body 24 to exhibiting out of plane curvature or twist deformation. For example when the section 24 is reversed upon itself, it is done so uniaxially, or without any degree of twist. The strands 22 are thus arranged with mating lay configurations which facilitate interlooping. It may further be seen that each group of strands 22 is comprised of a top, or center strand, adjacent the two lower strands. This configuration is obtained when the tape 30 and 32 is applied at the ends of the twisted section 24. In the embodiment shown herein the center strands are 38 and 48 in string sections 26 and 28 respectively. When the twisted section 24 is uniaxially reversed upon itself, the center strand 38 lies atop center strand 48.

The strands 22 are interlaced in what is referred to as a single phase juncture. This term is utilized to describe the wrapping of each strand of section 26 in a single phase, or on the order of 180°, around the nontwisted strands of section 28. Additionally, the strands 22 of section 26 are wrapped singularly about the strands 22 of section 28. Specifically, strand 36 extends outwardly of strand 46 before it continues under, inward and between strand 46 and 48. In like manner, strand 34 extends inwardly of strand 44 before it continues under, and outwardly of strand 44 to maximize the strength of the single phase juncture. It is important to note that for strength, interlacing of strands in conventional ropes is generally multi-phase in nature, and in effect is similar to weaving the strands together. This technique is not generally suitable for pigging string fabrication due to weight, size and balance considerations.

Referring now to FIG. 4, there is shown the interlooped strand assembly of FIG. 3 in a more taut configuration prior to final assembly. It may be seen that the strands 34, 36 and 38 are pulled foward of section 28 whereby the tension and rigidity in the interlaced configuration is maximized. In this manner the strands 22 of section 26 may be twisted against the interlooped strands and eye 12 to form a secure interconnection and the desired rigidity in said eye.

Figure 5:
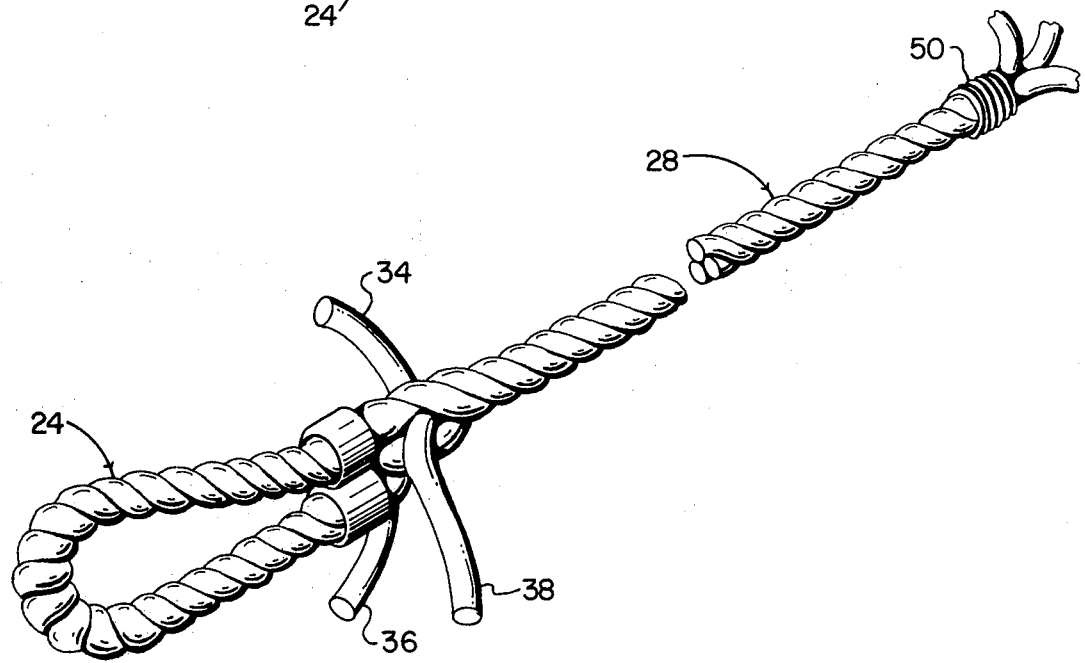
FIG. 5 is a perspective view of the pigging string of FIG. 4 and eye member formed therein after the subsequent assembly step of twisting the nontwisted strands thereagainst.

Referring now to FIG. 5, there is shown the twisted configuration of section 28 prior to cutting and finishing the interlooped strand configuration. The end of section 28 is wrapped with tape or string 50 at the desired length to prevent twisting. The strands 34, 36 and 38 are next cut generally flush with the periphery of the twisted strands of section 28. Because of the particular interloop configuration described herein there are substantially no ridges or loose strands and strands 22 of eye 12 blend smoothly into the remainder of the pigging string 10. Moreover, the eye 12 is formed to rigidly extend from the body of the pigging string and resist bending or flexing as is a disadvantage in many prior art constructions.

Final assembly of the pigging string 10 includes finishing the surface of the twisted strands 22 with hot wax, or the like. If the pigging string 10 is formed of nylon as is preferable, then the ends of cut strands 34, 36 and 38 are first melted upon and into the twisted strands of section 28 with a hot iron. Then the pigging string 10 is immersed in a hot wax bath such as GULF No. 75. It has been found that a wax adapted for, and heated to, 250° F. will provide a more optimal coating in that the abnormally high heat induces the interlooped and twisted strands to "seat" more uniformly therealong. To render this effect permanent the pigging string 10 is put in tension while cooling. Generally, a period on the order of five minutes has been proven satisfactory. In the particular fabrication technique described herein and because the eye 12 is secured with only a single phase juncture, it is important to maximize tensile strength and maintain a uniform twist density. Were a different technique utilized for securing the eye 12, the post-stressed cooling would not be as integral to the pigging string construction. However, it has been observed that such treatment concomitantly imparts a hardness and a flexibility, or pliability, to the pigging string 10, which features are generally not compatible although very desirable.

The fabrication of the pigging string is facilitated greatly by the above technique. Conventionally, it has been deemed impractical to fabricate such a short, single purpose, rope member with an integrally formed eye 12. The method of the present invention provides not only an acceptable technique for accomplishing this but permits the construction of such a rope member with consistent twist density between the eye 12 and lower body thereof, herein referred to as section 28. Twist density, or the number of strand twists per inch, is an assembly parameter heretofore deemed problematic in pigging string fabrication. The most apparent reason is the intertwining of strands to form the eye 12. Obviously when strand twists must be separated to insert, or back-splice, the loop strand therein, twist density will be altered on either side of the splice, which may be multi-phase. In the present invention a single phase juncture effects the equivalent rigidity of a woven back-splice, in part because twist tension is applied only after the strands are interlooped and secured taut, prior to coating.

Final twisting of the pigging string 10, as shown in FIG. 5, is preferably accomplished by attaching, or hooking, the eye 12 to the first point of support from which strands 34, 36 and 38 were originally detached. In this manner the interlooped strands 22 are secured under tension and in the condition in which they will be used. The pigging string is then cut to a fixed length, generally on the order of five and one half feet to seven feet. Shorter ropes are not practical due to loop size and longer ropes provide unnecessary weight and imbalance. The average pigging string is thus six to six and one half feet in length with the average diameter on the order of ¼ to ⅜ inch.

It is thus believed that the method and construction of the improved pigging string of the present invention will be apparent from the foregoing description. While the method and apparatus shown and described, have been characterized as being preferred, it will be obvious that various changes and modifications may be made without departing from the spirit and scope of the invention as defined in the following claims.

What is claimed is:

1. An improved pigging string of the type including a plurality of core filaments twisted into an elongated rope section of fixed length with a loop secured at one end thereof wherein said improvement comprises:
    a first length of core filaments tautly twisted into an intermediate loop section and being reversed upon itself;
    said loop section being intermediate of second and third core filament sections;
    said second core filament section being substantially shorter than said third core filament section and each of said second core filaments being looped around a single associated one of said third core filaments and folded back upon itself;
    said third core filament section being tautly twisted adjacent said loop section for securing said untwisted, looped and folded core filaments of said second core filament section securely thereagainst.

2. A three strand pigging string having an integrally formed, closed loop in one end thereof and comprising:
    a first length of strands being twisted one upon the other and disposed intermediate of second and third lengths of strands forming a loop member therebetween;

each strand of said second length of strands being looped around a single associated strand of said third length of strands and being folded back upon itself; and said third length of strands being twisted one upon the other and tightly against the outer portion of each backfolded strand of said second length of strands to compactly secure said second length of strands adjacent said loop member.

3. The pigging string of claim 2 wherein the strands are comprised of nylon material with the protruding ends of each strand of said second length of strands being melted into the twists of said third length of strands for permanently securing the interface between said third length of strands and said loop member in a rigid configuration.

4. A method of fabricating a pigging string having a loop integrally formed in one end thereof and including three strands of filaments twistably united therealong, said method comprising the steps of:

extending said strands in a lengthwise configuration between two points;

twisting a first segregated section of strands adjacent one of said points;

securing a first end of said first section of twisted strands adjacent the nontwisted strands;

untwisting a length of said strands on the opposite, second end of said first section of strands;

securing a second end of said first section of twisted strands adjacent said untwisted strands;

reversing said first section of strands upon itself;

disposing said second end of said first section of twisted strands adjacent said first end thereof;

interlooping adjacent untwisted strands through adjacent nontwisted strands with the ends of the untwisted strands extending outwardly therefrom; and twisting the nontwisted strands adjacent said loop for securing said untwisted strands thereagainst and providing said pigging string in a fixed length configuration.

5. The method set forth in claim 4 wherein the step of twisting the nontwisted strands includes the step of rotating said loop relative to said nontwisted strands and the other of said two points.

6. The method set forth in claim 4 wherein said step of reversing said first section of strands upon itself includes the steps of:

uniaxially folding said first section of strands substantially about the center thereof; and providing the untwisted strands adjacent the nontwisted strands in a complemental mating configuration, wherein the center strand of each comprises the top strand lay.

7. The method set forth in claim 4 wherein said step of interlooping adjacent strands includes the steps of:

wrapping the center strand of the untwisted strands once around the center strand of the nontwisted strands;

wrapping a first lower strand of the untwisted strands once around the adjacent, lower strand of the nontwisted strands; and wrapping a second lower strand of the untwisted strands once around the adjacent, lower strand of the nontwisted strands.

8. The method set forth in claim 4 wherein the step of twisting the nontwisted strands includes the steps of:

isolating the ends of the untwisted strands; and terminating said ends substantially flush with the periphery of the nontwisted strands after they have been twisted.

9. The method set forth in claim 8 wherein the strands are comprised of nylon material and the step of terminating said ends of the untwisted strands includes the step of melting the untwisted strands against the periphery of the nontwisted strands after they have been twisted.

10. The method set forth in claim 4 and further including the steps of:

dipping the pigging string of fixed length in a hot wax bath;

removing the pigging string from the wax bath;

stretching the pigging string between two points and applying tension thereto; and permitting the pigging string and wax thereon to cool while tension is applied thereto.

11. The method set forth in claim 10 wherein the hot wax bath is at a temperature of over 250° F.

* * * * *